US012561246B2

(12) United States Patent
Terpstra

(10) Patent No.: US 12,561,246 B2
(45) Date of Patent: Feb. 24, 2026

(54) VIRTUALIZED CACHES

(71) Applicant: SiFive, Inc., San Mateo, CA (US)

(72) Inventor: Wesley Waylon Terpstra, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 634 days.

(21) Appl. No.: 17/942,283

(22) Filed: Sep. 12, 2022

(65) Prior Publication Data

US 2023/0004494 A1     Jan. 5, 2023

Related U.S. Application Data

(62) Division of application No. 17/103,856, filed on Nov. 24, 2020, now Pat. No. 11,442,856.

(Continued)

(51) Int. Cl.
| | | |
|---|---|---|
| *G06F 12/08* | (2016.01) |
| *G06F 12/02* | (2006.01) |
| *G06F 12/0811* | (2016.01) |
| *G06F 12/0846* | (2016.01) |
| *G06F 12/0882* | (2016.01) |

(52) U.S. Cl.
CPC ...... *G06F 12/0811* (2013.01); *G06F 12/0246* (2013.01); *G06F 12/0848* (2013.01); *G06F 12/0882* (2013.01)

(58) Field of Classification Search
USPC ................. 716/100, 101, 102, 103, 104, 110
See application file for complete search history.

(56) References Cited

U.S. PATENT DOCUMENTS

| | | | |
|---|---|---|---|
| 9,734,064 B2 | 8/2017 | Vorbach |
| 9,772,943 B1 | 9/2017 | Mukherjee |
| | (Continued) | |

FOREIGN PATENT DOCUMENTS

| | | |
|---|---|---|
| CN | 101421706 A | 4/2009 |
| CN | 104516833 A | 4/2015 |
| | (Continued) | |

OTHER PUBLICATIONS

Office Action for Application No. CN202080080524.X, Mailed on Mar. 27, 2025, 17 pages.
International search report for application No. PCT/US2020/061983, mailed May 18, 2021. 14 pages.
Application No. KR10-2022-7021121 , Office Action, Mailed on Feb. 12, 2025, 12 pages.

(Continued)

*Primary Examiner* — Brian Ngo
(74) *Attorney, Agent, or Firm* — Kilpatrick Townsend & Stockton LLP

(57)     ABSTRACT

Systems and methods are disclosed for virtualized caches. For example, an integrated circuit (e.g., a processor) for executing instructions includes a virtually indexed physically tagged first-level (L1) cache configured to output to an outer memory system one or more bits of a virtual index of a cache access as one or more bits of a requestor identifier. For example, the L1 cache may be configured to operate as multiple logical L1 caches with a cache way of a size less than or equal to a virtual memory page size. For example, the integrated circuit may include an L2 cache of the outer memory system that is configured to receive the requestor identifier and implement a cache coherency protocol to disambiguate an L1 synonym occurring in multiple portions of the virtually indexed physically tagged L1 cache associated with different requestor identifier values.

20 Claims, 5 Drawing Sheets

Related U.S. Application Data

(60) Provisional application No. 62/940,235, filed on Nov. 25, 2019.

(56) References Cited

U.S. PATENT DOCUMENTS

| | | | |
|---|---|---|---|
| 2008/0222589 A1 | 9/2008 | Banerjee | |
| 2009/0216949 A1 | 8/2009 | Krumm et al. | |
| 2016/0004639 A1 | 1/2016 | Vorbach | |
| 2016/0224471 A1 | 8/2016 | Avudaiyappan | |
| 2019/0294554 A1 | 9/2019 | Bryant et al. | |
| 2020/0387659 A1* | 12/2020 | Wachs | G06F 30/333 |

FOREIGN PATENT DOCUMENTS

| | | | | |
|---|---|---|---|---|
| CN | 105612499 A | | 5/2016 | |
| CN | 109993683 A | * | 7/2019 | G06F 16/9024 |
| CN | 110235101 A | | 9/2019 | |
| GB | 2440263 A | | 1/2008 | |
| KR | 20190058317 A | | 5/2019 | |

OTHER PUBLICATIONS

Benedicte et al., "Design and Integration of Hierarchical-Placement Multi-level Caches for Real-Time Systems", Design, Automation & Test in Europe Conference & Exhibition (Date), EDAA, Mar. 19, 2018, pp. 455-460.

Application No. EP25150958.4 , Extended European Search Report, Mailed on Apr. 23, 2025, 10 pages.

Lee et al., "A 45nm 1.3GHZ 16.7 Double-Precision GFLOPS/W RISC-V Processor with Vector Accelerators", 2013 Proceedings of the European Solid State Circuits Conference, Sep. 22, 2014, 4 pages.

Nikolic et al., "Generating the Next Wave of Custom Silicon", Institute of Electrical and Electronics Engineers 44th European Solid State Circuits Conference (European Solid-state Circuits Conference), Sep. 3, 2018, pp. 6-11.

Stamenkovic , "System-on-Chip Design: Engineering or Art", 2006 25th International Conference on Microelectronics, May 14, 2006, pp. 372-379.

* cited by examiner

500

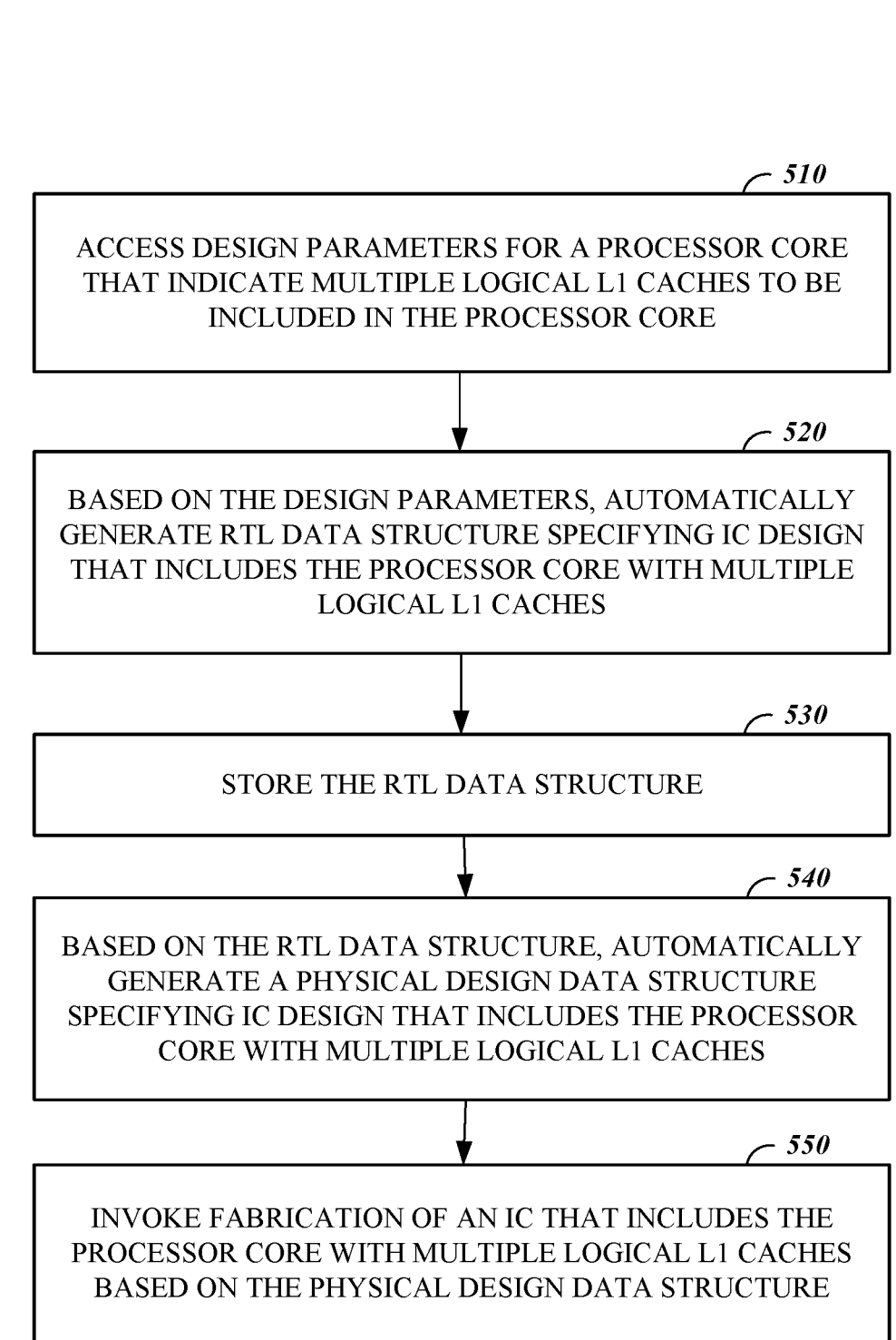

ACCESS DESIGN PARAMETERS FOR A PROCESSOR CORE THAT INDICATE MULTIPLE LOGICAL L1 CACHES TO BE INCLUDED IN THE PROCESSOR CORE
— 510

BASED ON THE DESIGN PARAMETERS, AUTOMATICALLY GENERATE RTL DATA STRUCTURE SPECIFYING IC DESIGN THAT INCLUDES THE PROCESSOR CORE WITH MULTIPLE LOGICAL L1 CACHES
— 520

STORE THE RTL DATA STRUCTURE
— 530

BASED ON THE RTL DATA STRUCTURE, AUTOMATICALLY GENERATE A PHYSICAL DESIGN DATA STRUCTURE SPECIFYING IC DESIGN THAT INCLUDES THE PROCESSOR CORE WITH MULTIPLE LOGICAL L1 CACHES
— 540

INVOKE FABRICATION OF AN IC THAT INCLUDES THE PROCESSOR CORE WITH MULTIPLE LOGICAL L1 CACHES BASED ON THE PHYSICAL DESIGN DATA STRUCTURE
— 550

FIG. 5

VIRTUALIZED CACHES

CROSS-REFERENCE TO RELATED APPLICATION(S)

This application is a division of U.S. patent application Ser. No. 17/103,856, which was filed on Nov. 24, 2020, now U.S. Pat. No. 11,442,856, which claims the benefit of U.S. Provisional Application No. 62/940,235, filed on Nov. 25, 2019, which is incorporated herein by reference in its entirety.

TECHNICAL FIELD

This disclosure relates to virtualized caches.

BACKGROUND

Integrated circuits are typically designed and tested in a multi-step process that involves multiple specialized engineers performing a variety of different design and verification tasks on an integrated circuit design. A variety of internal or proprietary (e.g., company-specific) integrated circuit design tool chains are typically used by these engineers to handle different parts of the integrated circuit design workflow of using commercial electronic design automation (EDA) tools.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 5 is a flow chart of an example of a process for generating an integrated circuit design including a processor core with a virtualized L1 cache based on design parameters specifying multiple logical L1 caches for the processor core.

DETAILED DESCRIPTION

Overview

Figure 1:
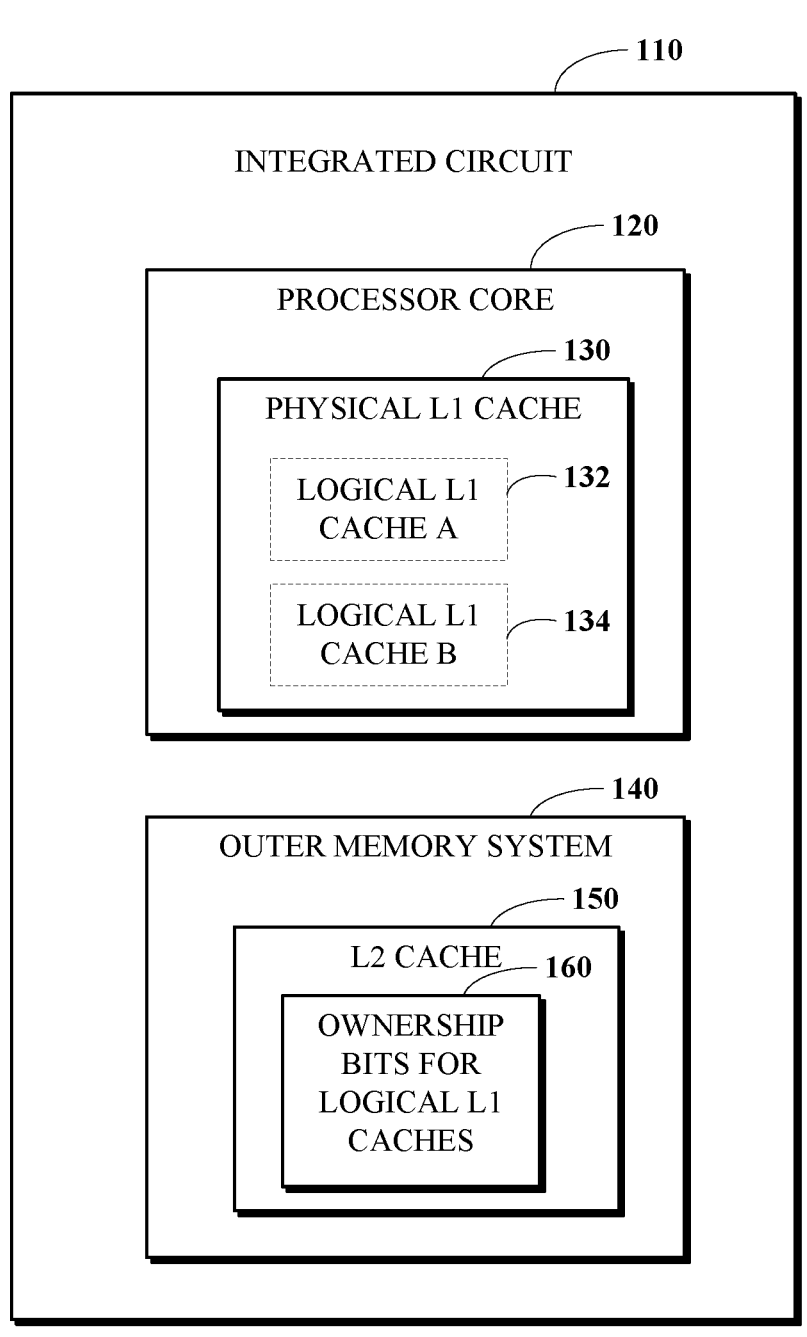
FIG. 1 is a block diagram of an example of an integrated circuit for executing instructions using a virtualized cache.

In some microprocessor first-level (L1) caches, a virtual address may be used to index cache static random-access memory (SRAM) and the corresponding physical address may be used to tag the entries (i.e., a virtually indexed physically tagged (VIPT) cache). As the virtual address is available earlier, indexing using the virtual address allows designs to overlap or parallelize computation of the physical address (e.g., using a translation lookaside buffer (TLB)) and cache access. However, using a VIPT cache can introduce the possibility of synonyms, where the same physical cache block appears at two different virtual indexes in cache, depending on the active virtual-physical translation.

One solution to the synonym problem is to limit the L1 cache size to be no greater than the virtual memory page size (e.g., 4 KiB, 8 KiB, 16 KiB, or 64 KiB) times the number of ways in the L1 cache. For example, in a system with 4 KiB pages, and a 4-way set-associative L1 cache, the L1 cache size would be limited to 16 KiB. Limiting the cache size to the virtual memory page size times the number of ways in the cache works, because the index bits of the virtual and physical addresses are identical below the virtual memory page size. However, for larger caches, limiting the size of the cache way to the virtual memory page size may entail using more ways and checking a larger number of candidate tags. Limiting the size of the cache way to the virtual memory page size also limits SRAM tag array depth (e.g., to 64 entries in a typical system with 64-byte cache blocks).

Described herein are techniques which overcome this limitation by splitting the L1 cache into multiple logical L1 caches, which share the same underlying physical implementation. These techniques may use the L2 cache to disambiguate L1 synonyms as a normal consequence of cache coherency. In some implementations, these techniques enable the L1 cache to safely hold two shared synonyms. Compared to way speculation, these techniques are simpler and may reduce or eliminate the impact on the pipeline.

There are three key observations which underlie this approach. First, the outer memory system usually has the capability to resolve ownership conflicts between multiple cores with respective L1 caches. Second, only the high bits of the virtual address can actually cause synonyms. Third, synonyms are relatively uncommon in real software, since physical pages shared between processes may often be similarly aligned. For example, larger RISC-V mega/giga-page mappings are always more aligned.

For example, in an L1 cache with 8 KiB per way in a system with 4 KiB pages, the highest virtual index bit can cause synonyms. This highest bit may be called the synonym address (SA). To prevent synonyms, requests with SA=0 may be handled as coming from logical L1 cache ID=0 and requests with SA=1 may be handled as coming from logical L1 cache ID=1. If there is another core with the same L1 cache configuration, it would use cache IDs 2 and 3, respectively. When core 1 requests a cache block which is owned by core 2, the outer memory system must probe core 2 to retrieve permissions on the block. Similarly, if there is a synonym, when core 1 ID=0 requests a block, if that block is held by the same core, but under ID=1, the memory system will probe core 1. In other words, whenever a synonym would have been created in the L1 cache, the outer memory subsystem eliminates the second copy via a looped back probe. The implementation to support two logical L1 caches associated with one core may be identical to the existing coherence policy used between cores 1 and 2.

These techniques may work equally well with modified exclusive shared invalid (MESI) schemes. In this situation, it is possible for the two synonyms to both be in the shared state. When one copy would be updated, the other copy is invalidated by a looped back probe. In a modified owned exclusive shared invalid (MOESI) system, the 'transfer' between virtual L1 caches of the same core covers a short distance. For example, in an update-based system, the synonym may transfer between virtual L1 caches of the same core and then notify the L2 cache directory of the transfer.

In some implementations, the outer memory system is automatically configured to accommodate a variable number of L1 caches. Therefore, this technique may operate without changes to the L2 caches, physical topology, or underlying coherence protocol. In some implementations, the only change is that the parameterization describing the L1 cache to the memory system now describes two L1 caches.

For a directory-based L2 cache implementation, the physical consequence of this technique is that the L2 cache now maintains more ownership bits (e.g., two ownership bits) per inner cache where it previously stored one ownership bit. Given the relative size of the tag, this is not particularly expensive.

Implementing these techniques in the L1 cache requires only that the requests from the L1 cache indicate which 'virtual L1 cache' sourced the request. Most coherence protocols (e.g., TileLink) include some form of requestor identifier. Thus, this identifier is widened by the number of bits in the synonym address (SA) (e.g., 1 bit or 2 bits) and the value is supplied from the SA. Conversely, when a probe request is received, the L1 cache must retrieve the SA from the destination identifier and use the SA as the high bit(s) when checking the state of the cache block. In some implementations, no other changes to the L1 cache are necessary.

These techniques can be extended to more than a single SA bit. For example, to support 16 KiB per way with a 4 KiB virtual memory page size, two SA bits may be used. For example, there may be four virtual L1 caches and the L2 cache may include four ownership bits per L1 cache. Larger synonym addresses (e.g., 3 bits) may be used, however, increasing the number of SA bits leads to an exponential increase in cost in the L2 cache's directory. In some implementations, if an exponential increase in cost in the L2 cache's directory is undesirable, then the directory may enforce exclusion among the virtual L1 caches, allowing a linear growth in cost with the number of SA bits. These techniques can be combined with way speculation to achieve large VIPT L1 caches.

These techniques may be applied to most coherence protocols (e.g., TileLink).

These techniques may be applied to most coherence policies (e.g., MOESI, MESI, and MI).

These techniques may be applied to coherent VIPT L1 instruction caches and VIPT L1 data caches. These techniques may be applied to virtually indexed virtually tagged (VIVT) L1 instruction caches and VIVT L1 data caches. These techniques may be applied to virtually indexed or virtually tagged L2 caches or at any level in addition to L1 or L2.

Some of these techniques may be combined with any coherent memory system, not just directory-based.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is a block diagram of an example of an integrated circuit 110 for executing instructions using a virtualized cache. The integrated circuit 110 includes a processor core (e.g., an IP core), which include a physical L1 cache 130. The physical L1 cache 130 is configured to include multiple logical L1 caches, logical L1 cache A 132 and logical L1 cache B 134. The integrated circuit 110 also includes an outer memory system 140. In this example, the outer memory system 140 includes an L2 cache 150, which may be configured to implement a cache coherency protocol/policy to maintain cache coherency across multiple L1 caches. In this example, the L2 cache 150 includes ownership bits 160 for multiple logical L1 caches, including the logical L1 cache A 132 and the logical L1 cache B 134. Although not shown in FIG. 1, the integrated circuit 110 may include multiple processor cores in some implementations. Although not shown in FIG. 1, the outer memory system 140 may include multiple layers.

The physical L1 cache 130 may be configured to output to the outer memory system 140 one or more bits of a virtual index (e.g., a synonym address (SA)) of a cache access as one or more bits of a requestor identifier. In some implementations, the physical L1 cache 130 is configured to receive one or more bits of a destination identifier for a probe request from the outer memory system 140 and use the one or more bits of the destination identifier as part of an index (e.g., as a synonym address) to check a state of a cache block. For example, the physical L1 cache may be a virtually indexed L1 cache (e.g., a VIPT or a VIVT cache). For example, the logical L1 cache A 132 and the logical L1 cache B 134 may have cache way sizes that are less than or equal to a virtual memory page size used by the processor core 120. For example, the size of a cache way in the physical L1 cache 130 may be equal to twice a virtual memory page size used by the processor core 120 of the integrated circuit 110 associated with the physical L1 cache 130, and the one or more bits of the virtual index may be a single bit. Although not shown in the example of FIG. 1, a physical L1 cache may be partitioned into more than two logical caches (e.g., four logical caches) to support an even larger physical cache size. For example, the physical L1 cache may be a data cache. For example, the physical L1 cache may be an instruction cache.

The L2 cache 150 may be configured to receive a requestor identifier and implement a cache coherency protocol to disambiguate an L1 synonym occurring in multiple portions (e.g., the logical L1 cache A 132 and the logical L1 cache B 134) of the physical L1 cache 130 associated with different requestor identifier values. For example, the L2 cache 150 may include ownership bits 160 that respectively correspond to each of multiple portions (e.g., the logical L1 cache A 132 and the logical L1 cache B 134) of the physical L1 cache 130 associated with different requestor identifier values. For example, the L2 cache 150 may be directory-based.

Figure 2:
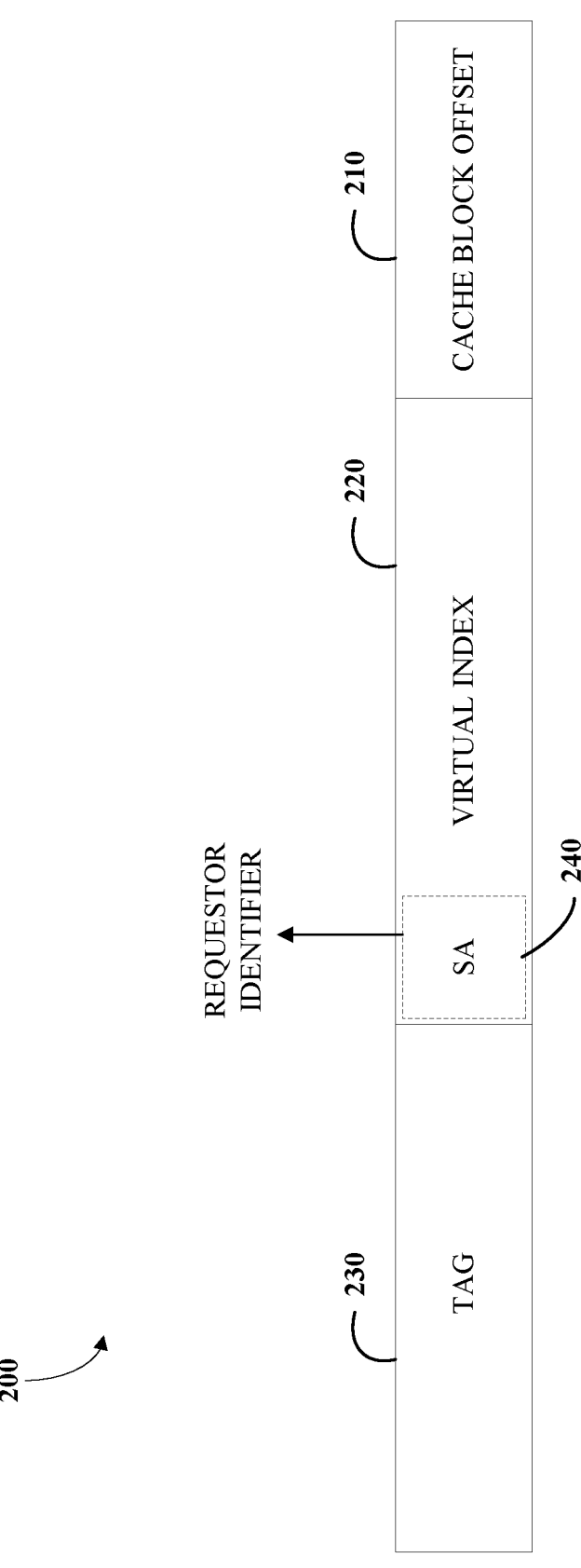
FIG. 2 is a diagram of an example of an effective memory address used to access memory via a virtualized cache.

FIG. 2 is a diagram of an example of an effective memory address 200 used to access memory via a virtualized cache (e.g., the physical L1 cache 130). The effective memory address 200 includes a cache block offset 210, a virtual index 220 used to select a cache block for access by a processor core (e.g., the processor core 120), and a tag 230 (e.g., a physical tag or a virtual tag). The virtual index 220 includes a synonym address 240 (SA) that includes one or more bits that can be used to select from among multiple logical caches within the physical cache. For example, the synonym address 240 may be a single bit to select from among two logical caches. For example, the synonym address 240 may be a pair of bits to select from among four logical caches. The synonym address 240 may be used to determine a requestor identifier for a logical cache of the physical cache that is used when communicating with an outer memory system (e.g., the outer memory system 140) to identify logical cache associated with a cache access operation.

Figure 3:
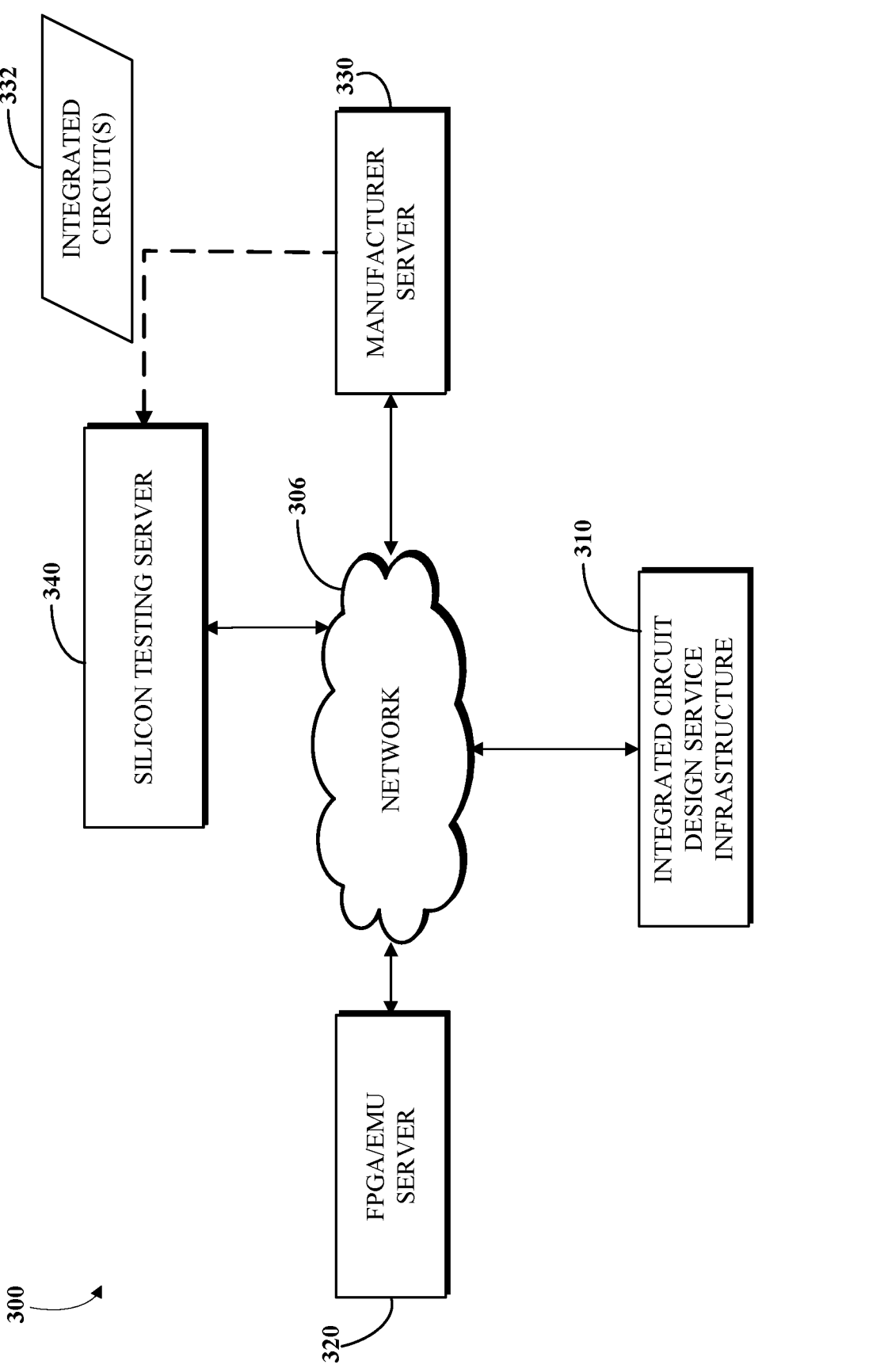
FIG. 3 is block diagram of an example of a system for facilitating design and manufacture of integrated circuits.

FIG. 3 is block diagram of an example of a system 300 for facilitating design and manufacture of integrated circuits. The system 300 includes, a network 306, an integrated circuit design service infrastructure 310, an FPGA/emulator server 320, and a manufacturer server 330. For example, a user may utilize a web client or a scripting API client to command the integrated circuit design service infrastructure 310 to automatically generate an integrated circuit design based a set of design parameter values selected by the user for one or more template integrated circuit designs. In some implementations, the integrated circuit design service infrastructure 310 may be configured to automatically generate an integrated circuit design (e.g., encoded in a register-transfer logic data structure, a field programmable gate array emulation data structure, and/or a physical design data structure, such as a GDSII file) that includes a processor core with multiple logical L1 caches.

For example, the integrated circuit design service infrastructure 310 may invoke (e.g., via network communications over the network 306) testing of the resulting design that is performed by the FPGA/emulation server 320 that is running one or more FPGAs or other types of hardware or software emulators. For example, the integrated circuit design service infrastructure 310 may invoke a test using a field programmable gate array, programmed based on a field programmable gate array emulation data structure, to obtain an emulation result. The field programmable gate array may be operating on the FPGA/emulation server 320, which may be a cloud server. Test results may be returned by the FPGA/emulation server 320 to the integrated circuit design service infrastructure 310 and relayed in a useful format to the user (e.g., via a web client or a scripting API client).

The integrated circuit design service infrastructure 310 may also facilitate the manufacture of integrated circuits using the integrated circuit design in a manufacturing facility associated with the manufacturer server 330. In some implementations, a physical design specification (e.g., a GDSII file) based on a physical design data structure for the integrated circuit is transmitted to the manufacturer server 330 to invoke manufacturing of the integrated circuit (e.g., using manufacturing equipment of the associated manufacturer). For example, the manufacturer server 330 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 310 supports multitenancy to allow multiple integrated circuit designs (e.g., from one or more users) to share fixed costs of manufacturing (e.g., reticle/mask generation, and/or shuttles wafer tests). For example, the integrated circuit design service infrastructure 310 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 330 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 332, update the integrated circuit design service infrastructure 310 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials, and update the integrated circuit design service infrastructure 310 on the status of the packaging and delivery process periodically or asynchronously. In some implementations, status updates may be relayed to the user when the user checks in using the web interface and/or the controller might email the user that updates are available.

In some implementations, the resulting integrated circuits 332 (e.g., physical chips) are delivered (e.g., via mail) to a silicon testing service provider associated with a silicon testing server 340. In some implementations, the resulting integrated circuits 332 (e.g., physical chips) are installed in a system controlled by silicon testing server 340 (e.g., a cloud server) making them quickly accessible to be run and tested remotely using network communications to control the operation of the integrated circuits 332. For example, a login to the silicon testing server 340 controlling manufacture of integrated circuits 332 may be sent to the integrated circuit design service infrastructure 310 and relayed to a user (e.g., via a web client). For example, the integrated circuit design service infrastructure 310 may implement the process 500 of FIG. 5 to automatically generate an integrated circuit design (e.g., including a register-transfer logic data structure and/or a physical design data structure) and to control fabrication and silicon testing of one or more integrated circuits 332, which may be structured based on the integrated circuit design.

Figure 4:
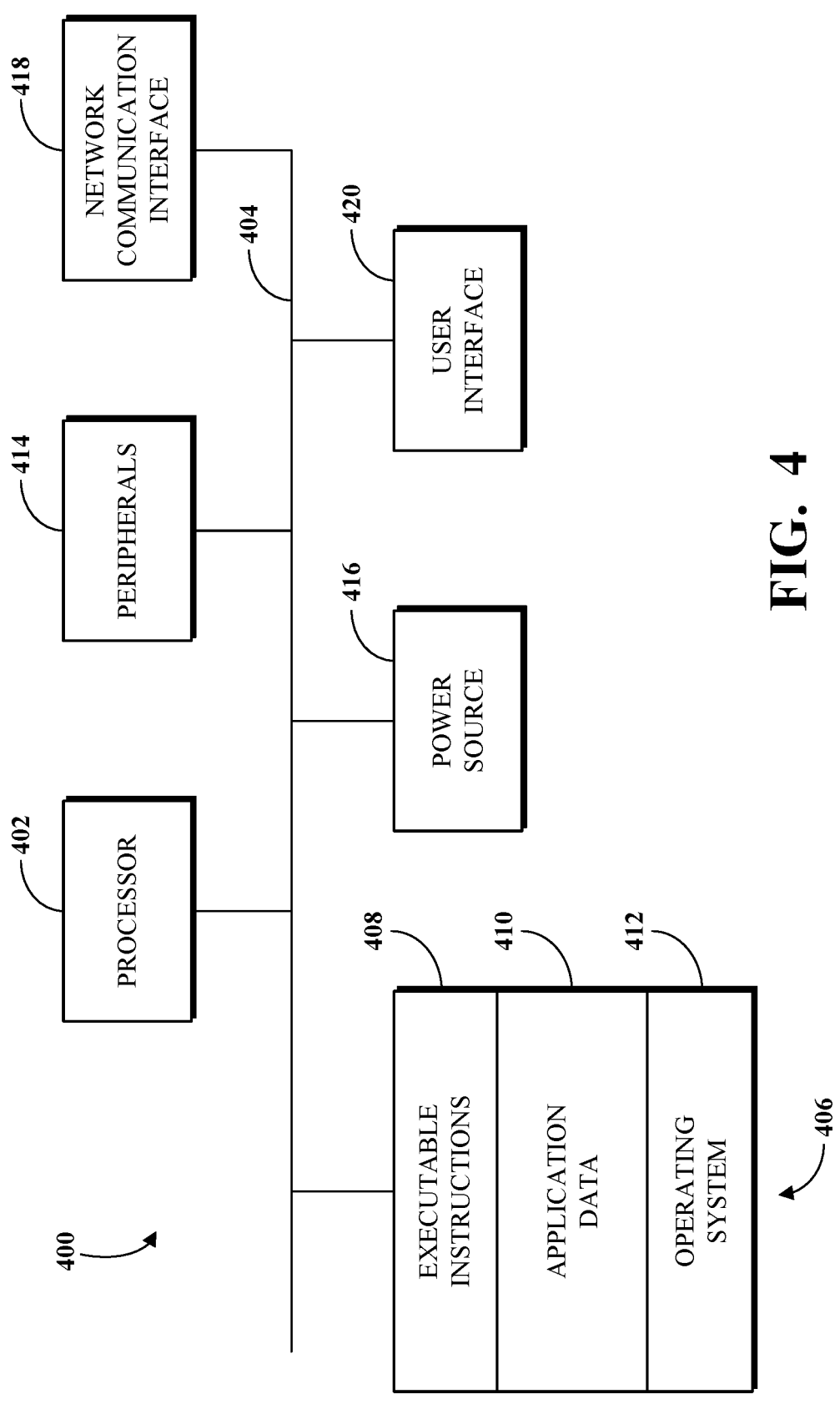
FIG. 4 is block diagram of an example of a system for facilitating design of integrated circuits.

FIG. 4 is block diagram of an example of a system 400 for facilitating design of integrated circuits. The system 400 is an example of an internal configuration of a computing device that may be used to implement the integrated circuit design service infrastructure 310 as a whole or one or more components of the integrated circuit design service infrastructure 310 of the system 300 shown in FIG. 3. The system 400 can include components or units, such as a processor 402, a bus 404, a memory 406, peripherals 414, a power source 416, a network communication interface 418, a user interface 420, other suitable components, or a combination thereof.

The processor 402 can be a central processing unit (CPU), such as a microprocessor, and can include single or multiple processors having single or multiple processing cores. Alternatively, the processor 402 can include another type of device, or multiple devices capable of manipulating or processing information. For example, the processor 402 can include multiple processors interconnected in any manner, including hardwired or networked, including wirelessly networked. In some implementations, the operations of the processor 402 can be distributed across multiple physical devices or units that can be coupled directly or across a local area or other suitable type of network. In some implementations, the processor 402 can include a cache, or cache memory, for local storage of operating data or instructions.

The memory 406 can include volatile memory, non-volatile memory, or a combination thereof. For example, the memory 406 can include volatile memory, such as one or more dynamic random-access memory (DRAM) modules such as double data rate (DDR) synchronous dynamic random-access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 406 can include another type of device, or multiple devices, now existing or hereafter developed, capable of storing data or instructions for processing by the processor 402. The processor 402 can access or manipulate data in the memory 406 via the bus 404. Although shown as a single block in FIG. 4, the memory 406 can be implemented as multiple units. For example, a system 400 can include volatile memory, such as RAM, and persistent memory, such as a hard drive or other storage.

The memory 406 can include executable instructions 408; data, such as application data 410 or an operating system 412; or a combination thereof for immediate access by the processor 402. The executable instructions 408 can include, for example, one or more application programs, which can be loaded or copied, in whole or in part, from non-volatile memory to volatile memory to be executed by the processor 402. The executable instructions 408 can be organized into programmable modules or algorithms, functional programs, codes, code segments, or combinations thereof to perform various functions described herein. For example, the executable instructions 408 can include instructions executable by the processor 402 to cause the system 400 to automatically, in response to a command, generate an integrated circuit design and associated test results based on a design parameters data structure. For example, the executable instructions 408 may include instructions, such as the Chisel code snippet of Appendix A, for generating an integrated circuit design including a processor core with multiple logical L1 caches based on a set of design parameters. The application data 410 can include, for example, user files, database catalogs or dictionaries, configuration information or functional programs, such as a web browser, a web server, a database server, or a combination thereof. The operating system 412 can be, for example, Microsoft Windows®, Mac OS X®, or Linux®; an operating system for a small device, such as a smartphone or tablet device; or an operating system for a large device, such as a mainframe computer. The memory 406 can include one or more devices and can utilize one or more types of storage, such as solid state or magnetic storage.

The peripherals 414 can be coupled to the processor 402 via the bus 404. The peripherals 414 can be sensors or detectors, or devices containing any number of sensors or detectors, which can monitor the system 400 itself or the environment around the system 400. For example, a system 400 can contain a temperature sensor for measuring temperatures of components of the system 400, such as the processor 402. In some implementations, the power source 416 can be a battery, and the system 400 can operate independently of an external power distribution system. Any of the components of the system 400, such as the peripherals 414 or the power source 416, can communicate with the processor 402 via the bus 404.

The network communication interface 418 can also be coupled to the processor 402 via the bus 404. In some implementations, the network communication interface 418 can include one or more transceivers. The network communication interface 418 can, for example, provide a connection or link to a network, such as the network 306, via a network interface, which can be a wired network interface, such as Ethernet, or a wireless network interface. For example, the system 400 can communicate with other devices via the network communication interface 418 and the network interface using one or more network protocols, such as Ethernet, TCP, IP, power line communication (PLC), WiFi, infrared, GPRS, GSM, CDMA, or other suitable protocols.

A user interface 420 can include a display; a positional input device, such as a mouse, touchpad, touchscreen, or the like; a keyboard; or other suitable human or machine interface devices. The user interface 420 can be coupled to the processor 402 via the bus 404. Other interface devices that permit a user to program or otherwise use the system 400 can be provided in addition to or as an alternative to a display. In some implementations, the user interface 420 can include a display, which can be a liquid crystal display (LCD), a cathode-ray tube (CRT), a light emitting diode (LED) display (e.g., an OLED display), or other suitable display. In some implementations, a client or server can omit the peripherals 414. The operations of the processor 402 can be distributed across multiple clients or servers, which can be coupled directly or across a local area or other suitable type of network. The memory 406 can be distributed across multiple clients or servers, such as network-based memory or memory in multiple clients or servers performing the operations of clients or servers. Although depicted here as a single bus, the bus 404 can be composed of multiple buses, which can be connected to one another through various bridges, controllers, or adapters.

FIG. 5 is a flow chart of an example of a process 500 for generating an integrated circuit design including a processor core with a virtualized L1 cache based on design parameters specifying multiple logical L1 caches for the processor core. The process 500 includes accessing 510 design parameters for a processor core that indicate multiple logical L1 caches to be included in the processor core; based on the design parameters, automatically generating 520 a register-transfer logic data structure specifying an integrated circuit design that includes the processor core with multiple logical L1 caches; storing 530 the register-transfer logic data structure; based on the register-transfer logic data structure, automatically generating 540 a physical design data structure specifying an integrated circuit design that includes the processor core with multiple logical L1 caches; and invoking 550 fabrication, based on the physical design data structure, of an integrated circuit that includes the processor core with multiple logical L1 caches. For example, the process 500 may be implemented by the integrated circuit design service infrastructure 310 of FIG. 3. For example, the process 500 may be implemented by the system 400 of FIG. 4.

The process 500 includes accessing 510 design parameters for a processor core that indicate multiple logical L1 caches to be included in the processor core. In some implementations, the design parameters may include a count of logical caches to be included in a processor core (e.g., an IP core). In some implementations, the design parameters may include a size of logical caches to be included in a processor core. In some implementations, the design parameters may include a virtual memory page size for the processor core. For example, the design parameters may be accessed 510 by receiving the design parameters (e.g., via network communications using the network communications interface 418). For example, the design parameters may be accessed 510 by reading the design parameters from memory (e.g., reading from the memory 406 via the bus 404).

The process 500 includes, based on the design parameters, automatically generating 520 a register-transfer logic data structure (e.g., a file, a database, a repository, or a bitstream) specifying an integrated circuit design that includes the processor core (e.g., the processor core 120) with multiple logical L1 caches (e.g., the logical L1 cache A 132 and the logical L1 cache B 134). For example, automatically generating 520 the register-transfer level data structure for the integrated circuit design may include invoking a register-transfer level service with input data based on the design parameters. For example, the multiple logical L1 caches of the processor core may be portions of a single physical L1 cache in the processor core. For example, the multiple logical L1 caches of the processor core may each have a cache way of a size equal to a virtual memory page size used by the processor core. In some implementations, the multiple logical L1 caches of the processor core are virtually indexed physically tagged caches. In some implementations, automatically generating 520 the register-transfer logic data structure includes executing Chisel code (e.g., including the code snippet of Appendix A) that takes the design parameters as inputs.

The process 500 includes storing 530 the register-transfer logic data structure (e.g., a file, a database, a repository, or a bitstream). For example, the register-transfer level data structure may be stored 530 in memory (e.g., the memory 406). For example, the register-transfer level data structure may be transmitted to an external device (e.g., a personal computing device) for display or storage. For example, the register-transfer level data structure may be transmitted via a network communications interface (e.g., the network communications interface 418).

The process 500 includes based on the register-transfer logic data structure, automatically generating 540 a physical design data structure (e.g., a physical design file) specifying an integrated circuit design that includes the processor core with multiple logical L1 caches. For example, generating 540 a physical design data structure for the integrated circuit may include invoking a physical design service with data based on the register-transfer level data structure and/or a design parameters data structure. For example, generating 540 a physical design data structure for the integrated circuit may include invoking synthesis and place & route tools (e.g., Synopsys™, Cadence™, and/or Mentor™ tools). For example, generating 540 a physical design data structure for the integrated circuit may include performing logical equivalent checking. For example, generating 540 a physical design data structure for the integrated circuit may include invoking static timing analysis tools. For example, generating 540 a physical design data structure for the integrated circuit may include performing design rule checking (DRC) and/or layout versus schematic (LVS) checking. For example, generating 540 a physical design data structure for the integrated circuit may include determining power, performance, and area estimates for the resulting integrated circuit design and providing these estimates as feedback to a user (e.g., a user of a web client). For example, the physical design data structure may include in less-technical terms whether there are any issues with the physical design. For example, the physical design data structure may highlight important components of the output of the synthesis and place & route tools. For example, the physical design data structure may include a GDSII file or an OASIS file. For example, generating 540 a physical design data structure for the integrated circuit may include managing and orchestrating physical design toolchains in a cloud. For example, generating 540 a physical design data structure for the integrated circuit may include handling database movement from tool to tool, and managing access to third party IP cores. For example, generating 540 a physical design data structure for the integrated circuit may include accessing template designs, which may allow for significant design reuse. For example, generating 540 a physical design data structure for the integrated circuit may include identifying those combinations to reduce workload. For example, generating 540 a physical design data structure for the integrated circuit may provide better or more compact error/issue reporting, by translating tool issues into manageable feedback and providing the actual error/output of tools in a deliverable format to a user (e.g., a user of a web client).

The process 500 includes invoking 550 fabrication, based on the physical design data structure, of an integrated circuit that includes the processor core with multiple logical L1 caches. In some implementations, a physical design specification (e.g., a GDSII file) based on a physical design data structure for the integrated circuit is transmitted via a network (e.g., the network 306) to a manufacturer server (e.g., the manufacturer server 330) to invoke 550 fabrication of the integrated circuit (e.g., using manufacturing equipment of the associated manufacturer). For example, the manufacturer server 330 may host a foundry tape out website that is configured to receive physical design specifications (e.g., as a GDSII file or an OASIS file) to schedule or otherwise facilitate fabrication of integrated circuits. In some implementations, fabrication of the integrated circuit may be invoked 550 by direct control of manufacturing equipment (e.g., via communication over a bus or serial port).

It should be noted that one or more steps of the process 500 may be omitted. For example, the steps 540 and/or 550 may be omitted. One or more steps may be added to the process 500, such as automatically generating a software development kit (SDK), documentation, a field programmable gate array emulation data structure, and/or a test plan for the integrated circuit design and/or invoking testing of the integrated circuit and receiving a test results data structure.

In a first aspect, the subject matter described in this specification can be embodied in an integrated circuit for executing instructions that includes a virtually indexed physically tagged L1 cache configured to output to an outer memory system one or more bits of a virtual index of a cache access as one or more bits of a requestor identifier. The integrated circuit may include an L2 cache of the outer memory system that is configured to receive the requestor identifier and implement a cache coherency protocol to disambiguate an L1 synonym occurring in multiple portions of the virtually indexed physically tagged L1 cache associated with different requestor identifier values. For example, the L2 cache may include ownership bits that respectively correspond to each of the multiple portions of the virtually indexed physically tagged L1 cache associated with different requestor identifier values. For example, the L2 cache may be directory-based. For example, the virtually indexed physically tagged L1 cache may be configured to receive one or more bits of a destination identifier for a probe request from the outer memory system and use the one or more bits of the destination identifier as part of an index to check a state of a cache block. In some implementations, the size of the cache way in the virtually indexed physically tagged L1 cache is equal to twice a virtual memory page size used by a core of the integrated circuit associated with the virtually indexed physically tagged L1 cache, and the one or more bits of the virtual index are a single bit. In some implementations, the size of the cache way in the virtually indexed physically tagged L1 cache is equal to four times a virtual memory page size used by a core of the integrated circuit associated with the virtually indexed physically tagged L1 cache, and the one or more bits of the virtual index are two bits. For example, the virtually indexed physically tagged L1 cache may be a data cache. For example, the virtually indexed physically tagged L1 cache may be an instruction cache.

In a second aspect, the subject matter described in this specification can be embodied in methods that include accessing design parameters for a processor core that indicate multiple logical L1 caches to be included in the processor core; based on the design parameters, automatically generating a register-transfer logic data structure specifying an integrated circuit design that includes the processor core with multiple logical L1 caches; and storing the register-transfer logic data structure. For example, the multiple logical L1 caches of the processor core may be portions of a single physical L1 cache in the processor core. In some implementations, the multiple logical L1 caches of the processor core each have a cache way of a size equal to a virtual memory page size used by the processor core. For example, the multiple logical L1 caches of the processor core may be virtually indexed physically tagged caches. In some implementations, automatically generating the register-transfer logic data structure comprises executing Chisel code that takes the design parameters as inputs. For example, automatically generating the register-transfer logic data structure may include executing the Chisel code snippet of Appendix A. In some implementations, the method further includes, based on the register-transfer logic data structure, automatically generating a physical design data structure specifying an integrated circuit design that includes the processor core with multiple logical L1 caches. In some implementations, the method further includes, invoking fabrication, based on the physical design data structure, of an integrated circuit that includes the processor core with multiple logical L1 caches.

In a third aspect, the subject matter described in this specification can be embodied in systems that include a network interface; a memory; and a processor, wherein the memory includes instructions executable by the processor to cause the system to: access design parameters for a processor core that indicate multiple logical L1 caches to be included in the processor core; based on the design parameters, automatically generate a register-transfer logic data structure specifying an integrated circuit design that includes the processor core with multiple logical L1 caches; and store the register-transfer logic data structure. In some implementations, the memory includes instructions executable by the processor to cause the system to: based on the register-transfer logic data structure, automatically generate a physical design data structure specifying an integrated circuit design that includes the processor core with multiple logical L1 caches. In some implementations, the memory includes instructions executable by the processor to cause the system to: invoke fabrication, based on the physical design data structure, of an integrated circuit that includes the processor core with multiple logical L1 caches. For example, the multiple logical L1 caches of the processor core may be portions of a single physical L1 cache in the processor core. In some implementations, the multiple logical L1 caches of the processor core each have a cache way of a size equal to a virtual memory page size used by the processor core. For example, the multiple logical L1 caches of the processor core may be virtually indexed physically tagged caches. In some implementations, automatically generating the register-transfer logic data structure comprises executing Chisel code that takes the design parameters as inputs. For example, the memory may include the Chisel code snippet of Appendix A.

In a fourth aspect, the subject matter described in this specification can be embodied in a non-transitory computer-readable storage medium that includes instructions that, when executed by a processor, facilitate performance of operations comprising: accessing design parameters for a processor core that indicate multiple logical L1 caches to be included in the processor core; based on the design parameters, automatically generating a register-transfer logic data structure specifying an integrated circuit design that includes the processor core with multiple logical L1 caches; and storing the register-transfer logic data structure. For example, the multiple logical L1 caches of the processor core may be portions of a single physical L1 cache in the processor core. In some implementations, the multiple logical L1 caches of the processor core each have a cache way of a size equal to a virtual memory page size used by the processor core. For example, the multiple logical L1 caches of the processor core may be virtually indexed physically tagged caches. In some implementations, automatically generating the register-transfer logic data structure comprises executing Chisel code that takes the design parameters as inputs. For example, the non-transitory computer-readable storage medium may store the Chisel code snippet of Appendix A. In some implementations, the non-transitory computer-readable storage medium includes instructions that, when executed by a processor, facilitate performance of operations comprising: based on the register-transfer logic data structure, automatically generating a physical design data structure specifying an integrated circuit design that includes the processor core with multiple logical L1 caches.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

APPENDIX A

```
package sifive.enterprise.core.bullet
import chisel3.
import freechips.rocketchip.util.
import freechips.rocketchip.tile.HasTileParameters
import freechips.rocketchip.tilelink.
import freechips.rocketchip.diplomacy.
import freechips.rocketchip.config.Parameters
class DCache (hartid: Int, crossing: ClockCrossingType)
    (implicit p: Parameters)
    extends freechips.rocketchip.rocket.DCache (hartid,
        crossing) (p) with HasTileParameters{
    override               protected               def
        cacheClientParameters=cfg.scratch.map      (x=>Seq
        ()).getOrElse{
        val untagBits=lgCacheBlockBytes+cfg.nSets.log2
        val nCacheClients=if (usingVM) 1<<(0 max (un-
            tagBits-pgIdxBits)) else 1
        (0              until              nCacheClients).map
            (i=>TLClientParameters(
            name=s"Core ${hartid} DCache ",
            sourceId=IdRange (i, i+1),
            supportsProbe=TransferSizes     (cfg.blockBytes,
                cfg.blockBytes)))}
    override lazy val module=new DCacheModule (this)
}
class DCacheModule (outer: DCache) extends
freechips.rocketchip.rocket.DCacheModule (outer){
    override def tagLSB: Int=if (usingVM) untagBits min
        pgIdxBits else untagBits
    override def probeIdx (b: TLBundleB): UInt=
        b. source.extractOption (untagBits-tagLSB-1, 0)##
            b.address (tagLSB-1, idxLSB)
    override def addressToProbe (vaddr: UInt, paddr:
        UInt): TLBundleB={
        val res=Wire (new TLBundleB (edge.bundle),
            chisel3. DontCare)
        res.address:=paddr
```

```
    res.source:=vaddr.extract (untagBits-1, tagLSB)
    res
}
  override def acquire (vaddr: UInt, paddr: UInt, param:
    UInt): TLBundleA={
    val block_addr=paddr>> lgCacheBlockBytes <<
      lgCacheBlockBytes
    if (!edge.manager.any SupportAcquireT)}
      Wire (new TLBundleA (edge.bundle), DontCare)
    } else {
      edge.AcquireBlock (vaddr.extract (untagBits-1,
        tagLSB), block_addr, lgCacheBlockBytes.U,
        param)._ 2
    }
  }
}
}
```

What is claimed is:

1. A method comprising:

accessing design parameters for a processor core that indicate multiple logical L1 caches to be included in the processor core;

based on the design parameters, automatically generating a register-transfer logic data structure specifying an integrated circuit design that includes the processor core with multiple logical L1 caches; and storing the register-transfer logic data structure.

2. The method of claim 1, in which the multiple logical L1 caches of the processor core are portions of a single physical L1 cache in the processor core.

3. The method of claim 1, in which the multiple logical L1 caches of the processor core each have a cache way of a size equal to a virtual memory page size used by the processor core.

4. The method of claim 1, in which the multiple logical L1 caches of the processor core are virtually indexed physically tagged caches.

5. The method of claim 1, in which automatically generating the register-transfer logic data structure comprises executing Chisel code that takes the design parameters as inputs.

6. The method of claim 1, comprising:

based on the register-transfer logic data structure, automatically generating a physical design data structure specifying an integrated circuit design that includes the processor core with multiple logical L1 caches.

7. The method of claim 6, comprising:

invoking fabrication, based on the physical design data structure, of an integrated circuit that includes the processor core with multiple logical L1 caches.

8. A system comprising:

a memory; and a processor, wherein the memory includes instructions executable by the processor to cause the system to:

access design parameters for a processor core that indicate multiple logical L1 caches to be included in the processor core;

based on the design parameters, automatically generate a register-transfer logic data structure specifying an integrated circuit design that includes the processor core with multiple logical L1 caches; and store the register-transfer logic data structure.

9. The system of claim 8, wherein the memory includes instructions executable by the processor to cause the system to:

based on the register-transfer logic data structure, automatically generate a physical design data structure specifying an integrated circuit design that includes the processor core with multiple logical L1 caches.

10. The system of claim 9, wherein the memory includes instructions executable by the processor to cause the system to:

invoke fabrication, based on the physical design data structure, of an integrated circuit that includes the processor core with multiple logical L1 caches.

11. The system of claim 8, in which the multiple logical L1 caches of the processor core are portions of a single physical L1 cache in the processor core.

12. The system of claim 8, in which the multiple logical L1 caches of the processor core each have a cache way of a size equal to a virtual memory page size used by the processor core.

13. The system of claim 8, in which the multiple logical L1 caches of the processor core are virtually indexed physically tagged caches.

14. The system of claim 8, wherein the memory includes instructions executable by the processor to cause the system to:

execute Chisel code that takes the design parameters as inputs.

15. A non-transitory computer-readable storage medium that includes instructions that, when executed by a processor, facilitate performance of operations comprising:

accessing design parameters for a processor core that indicate multiple logical L1 caches to be included in the processor core;

based on the design parameters, automatically generating a register-transfer logic data structure specifying an integrated circuit design that includes the processor core with multiple logical L1 caches; and storing the register-transfer logic data structure.

16. The non-transitory computer-readable storage medium of claim 15, in which the multiple logical L1 caches of the processor core are portions of a single physical L1 cache in the processor core.

17. The non-transitory computer-readable storage medium of claim 15, in which the multiple logical L1 caches of the processor core each have a cache way of a size equal to a virtual memory page size used by the processor core.

18. The non-transitory computer-readable storage medium of claim 15, in which the multiple logical L1 caches of the processor core are virtually indexed physically tagged caches.

19. The non-transitory computer-readable storage medium of claim 15, in which automatically generating the register-transfer logic data structure comprises executing Chisel code that takes the design parameters as inputs.

20. The non-transitory computer-readable storage medium of claim 15, including instructions that, when executed by a processor, facilitate performance of operations comprising:

based on the register-transfer logic data structure, automatically generating a physical design data structure specifying an integrated circuit design that includes the processor core with multiple logical L1 caches.

* * * * *